US012129157B2

(12) United States Patent
Standish

(10) Patent No.: US 12,129,157 B2
(45) Date of Patent: Oct. 29, 2024

(54) SCREW JACK

(71) Applicant: Scott Standish, Caledonia, MN (US)

(72) Inventor: Scott Standish, Caledonia, MN (US)

( * ) Notice: Subject to any disclaimer, the term of this patent is extended or adjusted under 35 U.S.C. 154(b) by 0 days.

(21) Appl. No.: 17/578,420

(22) Filed: Jan. 18, 2022

(65) Prior Publication Data

US 2024/0076171 A1 Mar. 7, 2024

(51) Int. Cl.
*B66F 3/08* (2006.01)

(52) U.S. Cl.
CPC .................................... *B66F 3/08* (2013.01)

(58) Field of Classification Search
CPC ...... B66F 3/08; B66F 3/00; B66F 3/28; B66F 5/00; B66F 5/025
See application file for complete search history.

(56) References Cited

U.S. PATENT DOCUMENTS 6,102,637 A * 8/2000 Mocci ..................... B60P 7/083 74/544
6,695,289 B1 * 2/2004 Mickael .................... B66F 3/44 187/211
6,910,677 B1 * 6/2005 Miller ....................... B66F 3/44 254/DIG. 1
7,988,131 B1 * 8/2011 Carder ...................... B66F 3/12 254/122
10,280,037 B2 * 5/2019 Henderson ............ B60P 7/0846
2007/0114502 A1 * 5/2007 Garceau .................... B66F 3/12 254/126

* cited by examiner

*Primary Examiner* — Lee D Wilson
(74) *Attorney, Agent, or Firm* — LAW OFFICES OF ALOZIE N. ETUFUGH, PLLC; Alozie Etufugh

(57) ABSTRACT

The present invention provides a screw jack a hollow standard, internally threaded screw portion encased in the hollow standard; a socket suitable for engaging a rotational impact wherein the impact incorporates turning capacity from a power drill for the engagement that provides a lifting or lowering of the jack in use. A method of use is further included.

4 Claims, 4 Drawing Sheets

SCREW JACK

BACKGROUND

Jacks have been in use for a multitude of applications from raising up weights, blocks, cars and other items that may need raising up but cannot be done manually. In most instances jacks are placed underneath the objects to be raised and manually manipulated up via an adapter. In some instances, such operation might include using provided screws as turners to raise or lower the jack. This process is cumbersome and has caused the receiving end of the screw to wear out unevenly or worse. It is also reasonable to imagine the labor necessary to effect the operation of the screw jack if access to the screw facility is not conducive to the manual work of operating the jack.

Some screw jacks are fitted with sockets that are adapted to receive a corresponding tool that is usable to cooperatively engage the gears of the jack. In other instances, the jacks have been adapted to incorporate electricity to motorize the lift system for the jack. In some instances, such electric motor usable to motorize the jack may need to be adapted for plugging into outlets and portability of such adapted jacks are reduced or non-existent. In everyday lives, the need to use a jack such as described herein may be impacted by location or circumstance. As an example, a car with a flat-tire may happen in the middle of nowhere that electricity is not available would not have use for the jack needing electricity. Where there is need to for plug-in electric power to engage the jack, an owner or user of the jack is left without capacity to use the jack.

As shown in the foregoing, a portable screw jack incorporating a rotational tool that operably causes the jack to raise or lower an object for use is needed and useful for workers and artisans. Such a product is disclosed herein.

SUMMARY

In one embodiment, the present invention provides a screw jack comprising a hollow member having a main and secondary member in the hollow member, said main and secondary members having internal threaded screws that are suitably engaging and cooperating for a lifting or lowering of the screw jack. The screw jack preferably includes a socket for engaging an impact operably configured to engage and rotate the threaded screws of the screw jack for the lifting or lowering of the jack.

The screw jack of the present invention is preferably used with the impact to provide rotational capacity for the turning of the screws and may include an extender having a distal end that is configured to engage the socket of the base screw jack for the intended purpose.

DETAILED DESCRIPTION

In an embodiment of the present invention, an enhanced screw jack suitable for the raising up or lifting a multitude of weights, blocks, cars, equipment and other items that may need some form of ground clearance. The enhanced screw jack of the present invention may operably be engaged with an impact or preferred driver to actuate the screw for a desired outcome of raising an equipment. Those familiar in the art would typically utilize an impact or driver in combination with the screw jack to obtain the desired outcome. The impact or driver usable in the instant disclosure may be a power drill having a tool end that is preferably suitable to engage the screw portion of the screw jack. Said power drill may suitably incorporate an adapted driver end to fit the screw portion, as disclosed in U.S. Pat. No. 1,734,831.

Figure 1:
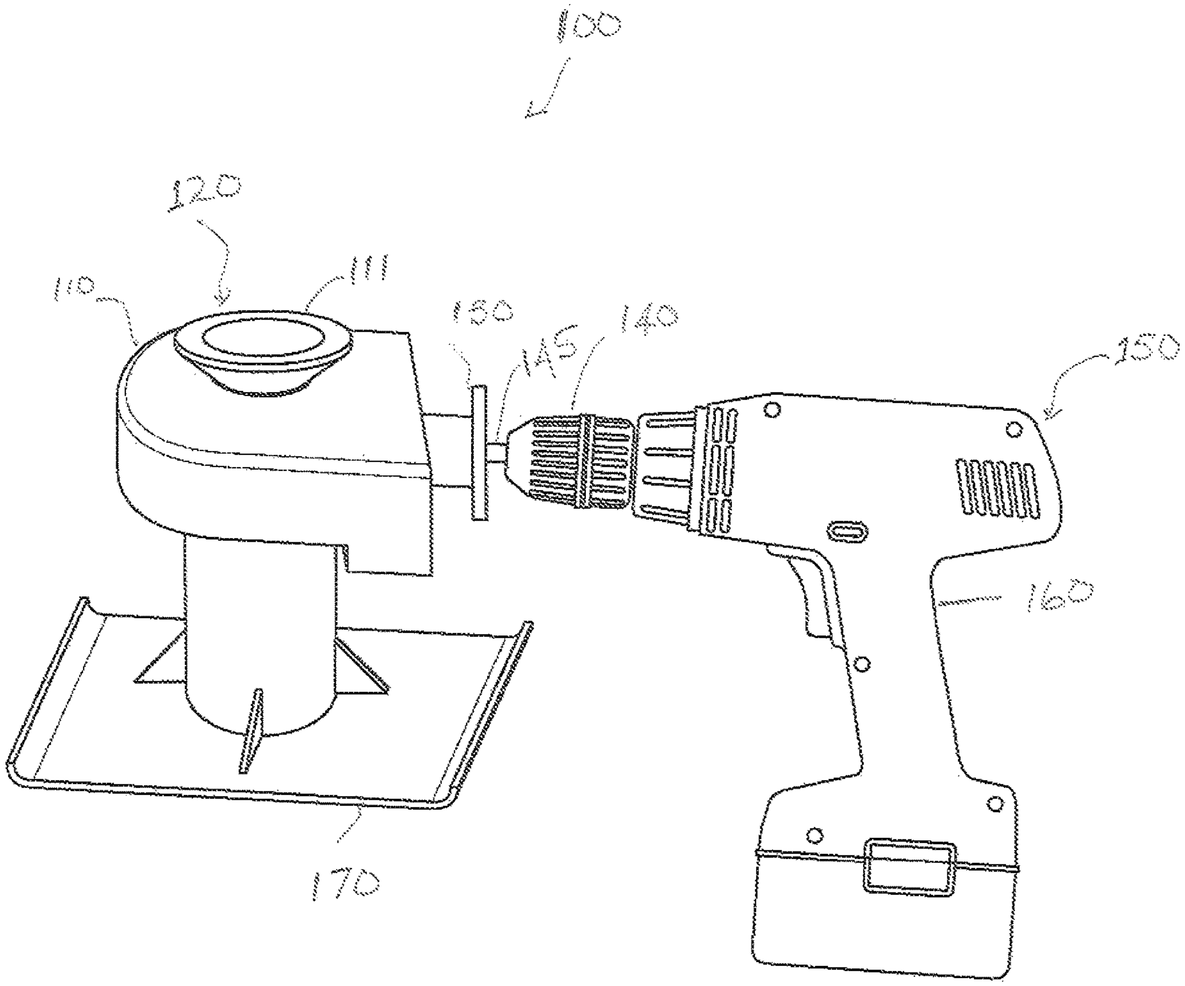
FIG. 1 illustrates a perspective view of the enhanced screw jack showing the socket and impact according to the present invention.

Referring to FIG. 1 is presented, a perspective view of an enhanced screw jack 100, according to the instant disclosure. The enhance screw jack 100 of the present invention preferably comprises a base 170, a lift screw housing 110 having a lift screw jack 120, a lift placement plate 111, an adaptable socket 130 for an impact or power drill 150 having a head 140 with handle 160. The impact end 145 of the head 140 may be extendable to provide reach for instances with placement of the screw jack farther away from the edges of the object being raised. The screw jack useful in the present invention may be a double screw jack that may be adapted for use as a car jack or for similar applications. The screw jack 120 may preferably include a hollow or sleeve-like lifting member having a cylindrical bore with internal thread that is rotatable with the turning of the screw to either raise the lift placement plate 111 or return same to the jack's rested position as displayed in 120. In typical use, the adaptable socket 130 is preferably suitable to engage the screw portion of the power drill wherein such engagement turns the screw in the internal thread in the cylindrical portion for the outward effect of either raising the plate 111 or lowering same for intended purpose. The power drill 150 of the instant disclosure may, in some instances, be separated or removed from the enhanced screw jack 120 when not in use or upon execution of a lift or lowering of same.

Figure 2:
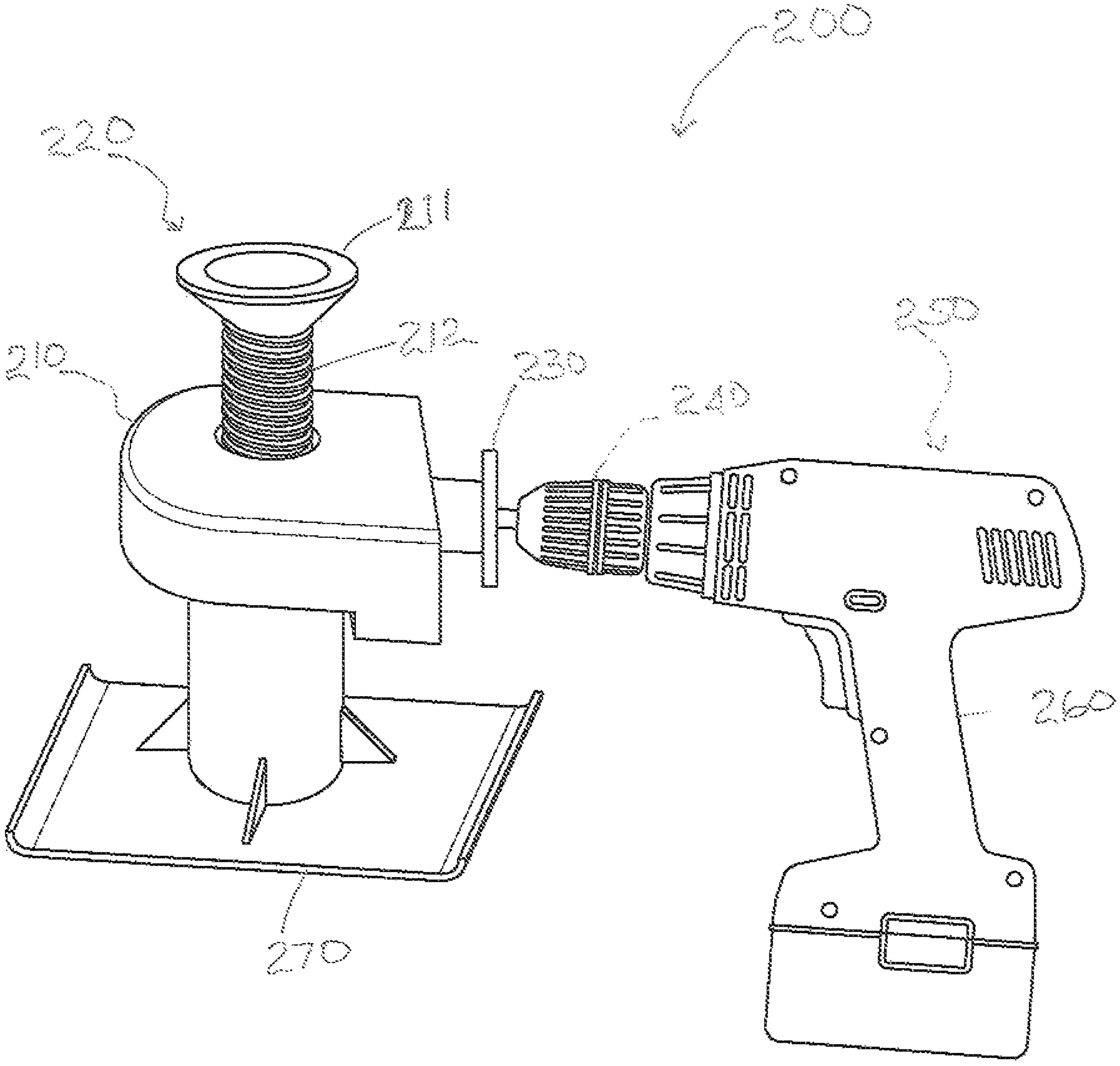
FIG. 2 illustrates a side perspective view of the enhanced screw jack showing a mid-raised portion according to the present invention.

In the embodiment disclosed in FIG. 2, a perspective view of an enhanced screw jack 200, according to the instant disclosure. The enhance screw jack 200 of the present invention preferably comprises a base 270, a lift screw housing 210 having a mid-point lift screw jack 220, a lift placement plate 211 that is engaged and displaying cylindrical screw thread 212, an adaptable socket 230 for an impact or power drill 250 having a head 240 with handle 260. The power drill or impact 250 suitable for the screw jack 220 is preferably cordless or rechargeable to provide the portability and use in locations wherein the electrical source is not proximal, as may be imagined in the field of use. The screw jack 220 useful in the present invention may be a double screw jack that may be adapted for use to raise weight or weighted platforms for clearance and the like. The screw jack 220 may preferably include a hollow or sleeve-like lifting member having a cylindrical bore with internal thread that is rotatable with the turning of the screw to either raise the lift placement plate 211 or return same to the jack's mid-raised position as displayed in 220. In typical use, the adaptable socket 230 is preferably suitable to engage the screw portion of the power drill wherein such engagement turns the screw in the internal thread in the cylindrical portion for the outward effect of either raising the plate 211 or lowering same for intended purpose. The power drill 250 of the instant disclosure may, in some instances, be separated or removed from the enhanced screw jack 220 when not in use or upon execution of a lift or lowering of same.

Figure 3:
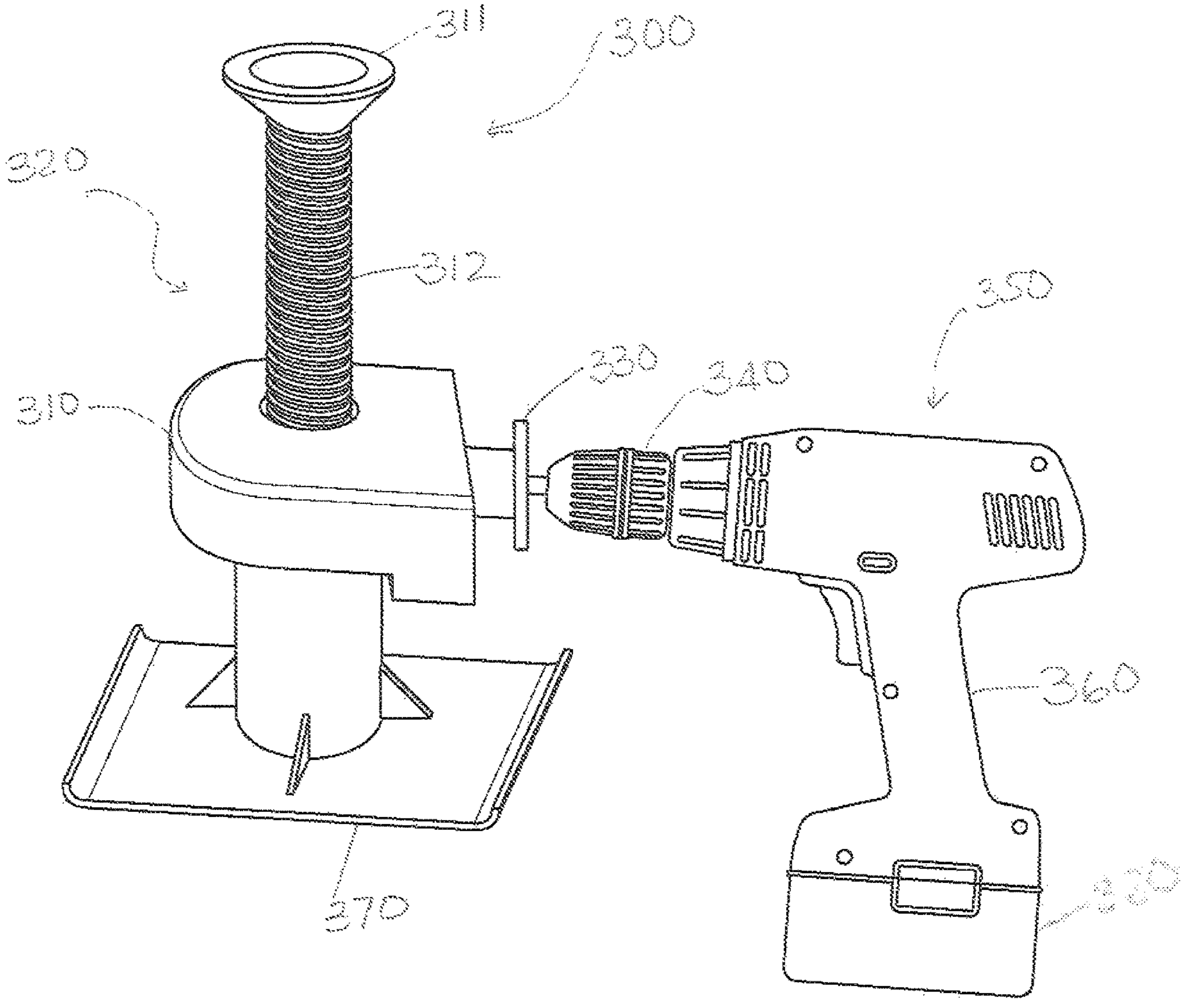
FIG. 3 illustrates a perspective view of the enhanced screw jack showing a raised screw portion according to the present invention.
Figure 4:
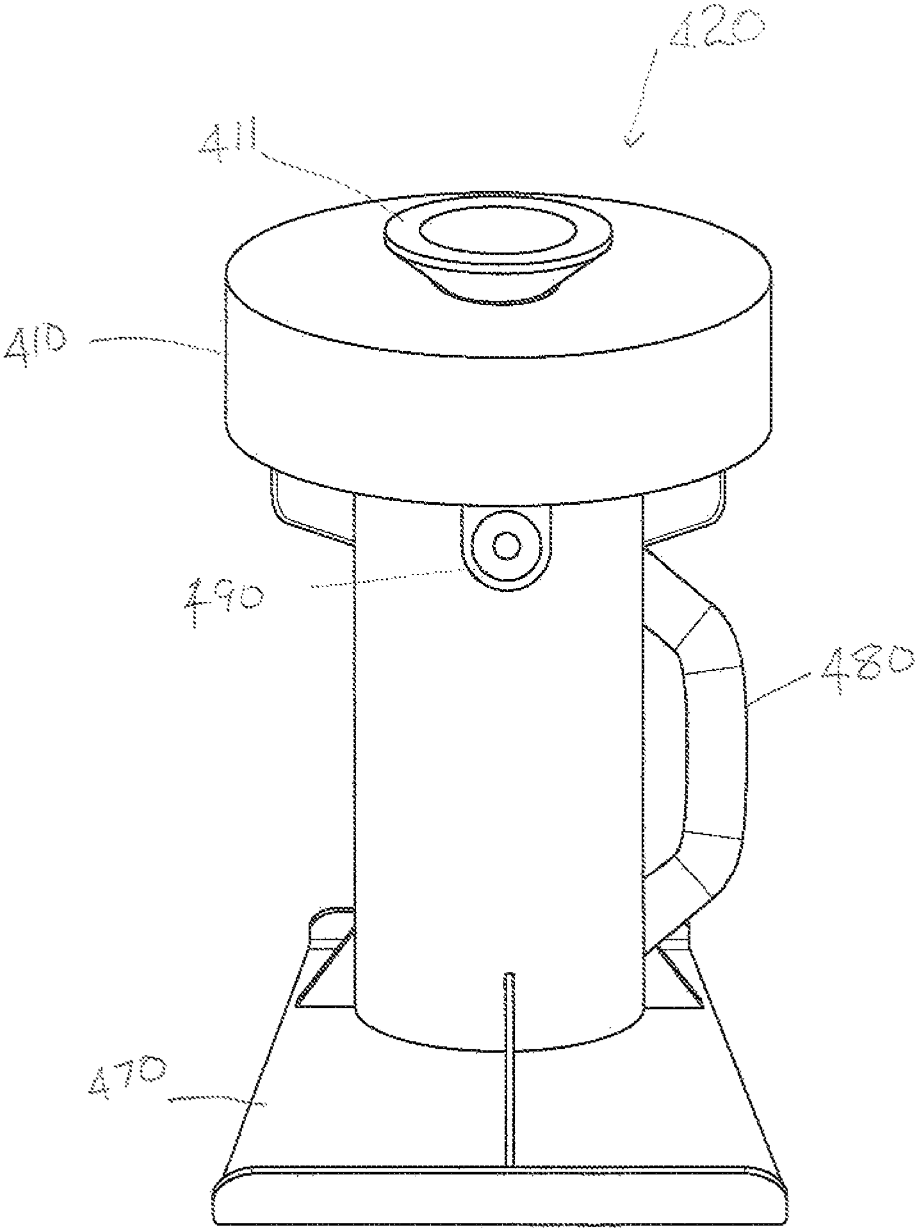
FIG. 4 illustrates a side perspective view of the enhanced screw jack showing a grip handle portion according to the present invention.

Referring now to FIG. 3, a perspective view of an enhanced screw jack 300, according to the instant disclosure showing a base 370, a lift screw housing 310 having a lift screw jack 320, a lift placement plate 311 that is engaged and displaying a raised cylindrical screw thread 312, an adaptable socket 330 for an impact or power drill 350 having a head 340 with handle 360. The screw jack useful in the present invention may be a double screw jack that may be adapted for use as a car jack or for similar applications. The power drill or impact 350 suitable for the screw jack 320 is preferably cordless or rechargeable and may include a battery pack 380 to provide the portability, continued charge for use in locations wherein the electrical source is not proximal, as may be imagined in the field of use. The screw jack 320 useful in the present invention may be a double screw jack that may be adapted for use to raise weight or weighted platforms for clearance and the like. The screw jack 220 may preferably include a hollow or sleeve-like lifting member having a cylindrical bore with internal thread that is rotatable with the turning of the screw to either raise the lift placement plate 311 or return same to the jack's raised position as displayed in 320. In typical use, the adaptable socket 330 is preferably suitable to engage the screw portion of the power drill wherein such engagement turns the screw in the internal thread in the cylindrical portion for the outward effect of either raising the plate 311 or lowering same for intended purpose. The power drill 350 of the instant disclosure may, in some instances, be separated or removed from the enhanced screw jack 320 when not in use or upon execution of a lift or lowering of same FIG. 4 presents an enlarged view of the enhanced screw jack 420. The placement plate 411 is displayed in a rest position showing the screw housing 410 with a socket end 490, said socket end suitable to engage a screw or tool from an impact. Further shown is a handle 480 for ease in portability of the enhanced screw jack 420. A base 470 is shown for the enhanced screw jack of the present invention.

The screw jack of the present invention includes a hollow standard with the screw housing 110, 210, 310 as an example, and a cylindrical screw with internal thread, a main member incorporating screw portions that engage for an upward and downward motion of the screw to provide a lifting and lowering as desired. The body of the screw jack includes a socket 130, 230, 330 suitable to engage a rotational impact for the desired lifting motions. In some instance, a vibrational motion may be incorporated into the screw actuation process to provide an intended lifting or lowering.

The impact or power drill portion of the screw jack combination may be provided with a suitable extended to the distal end of an engagement end to provide rotation to the base of the screw jack that may preferably include a handle for portability. In use, the distal end of the impact may preferably include a locking end to engage the screw portion or member of the screw jack. In combination, the screw jack and the power drill or impact, the slotting of the connection, enabling portability without the demand for direct electricity connectivity provides a product for use in raising or 'jacking up' a vehicle or weighted platform, thus eliminating the manual challenge of hand turning a tool to accomplish such raise. Where the placement of the jack calls for a location away from the edge, the present invention provides for a jack that may operably incorporate an extender to the power impact end for reach and maneuverability.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed:

1. A screw jack, comprising:

a base wherein said base comprises of a lift screw housing, wherein said lift screw housing comprises of a lift screw jack and a secondary member, said lift screw jack capable of vertical motion and wherein said lift screw jack is retractable within a hollow portion of said lift screw housing, wherein said secondary member comprises of a cylindrical bore with internal thread rotatably engaged with said lift screw jack; and an adaptable socket, wherein said adaptable socket is perpendicular to said lift screw jack, wherein said adaptable socket is functionally engaged with said secondary member via a screw, said adaptable socket being structurally configured to be engaged by a screw portion of an impact, wherein rotational motion of said screw portion of said impact drives a lifting or lowering motion of said lift screw jack by turning said screw.

2. The screw jack of claim 1, wherein the rotation of the impact is accomplished with a rechargeable impact.

3. The screw jack of claim 1, wherein the impact is powered by a replaceable battery pack.

4. The screw jack of claim 1, further comprising a lift placement plate positioned atop said lift screw jack.

* * * * *